United States Patent [19]

Holcomb et al.

[11] Patent Number: 4,911,401
[45] Date of Patent: Mar. 27, 1990

[54] VALVE HAVING IMPROVED BLEED ASSEMBLY

[75] Inventors: Gregory B. Holcomb; Stephen L. Tyler, both of Diamond Bar; James W. Zimmerman, Walnut, all of Calif.

[73] Assignee: The Toro Company, Minneapolis, Minn.

[21] Appl. No.: 388,773

[22] Filed: May 15, 1989

[51] Int. Cl.⁴ ...................... F16K 31/02; F16K 43/00
[52] U.S. Cl. .................................. 251/30.03; 137/315; 251/30.05; 251/45
[58] Field of Search ...................... 137/315, 24, 484.2; 251/30.02, 30.03, 30.04, 30.05, 45, 46; 92/103 F

[56] References Cited

U.S. PATENT DOCUMENTS

| | | | |
|---|---|---|---|
| 1,034,826 | 8/1912 | Payne . | |
| 3,967,808 | 7/1976 | Lieding | 251/46 |
| 4,105,186 | 8/1978 | Eby | 251/35 |
| 4,295,631 | 10/1981 | Allen | 251/30.03 |
| 4,505,450 | 3/1985 | Saarem et al. | 251/24 |
| 4,671,485 | 6/1987 | Saarem | 251/24 |
| 4,793,588 | 12/1988 | Laverty | 251/30.03 |

FOREIGN PATENT DOCUMENTS 789241  1/1958  United Kingdom ............. 251/30.03

*Primary Examiner*—George L. Walton
*Attorney, Agent, or Firm*—James W. Miller

[57] ABSTRACT

An improved valve includes an inlet, an outlet and a valve seat. A flexible diaphragm assembly seals against the valve seat. A bleed assembly extends into a pressure chamber located above the diaphragm for bleeding fluid pressure out of the chamber, thereby opening the valve. The bleed assembly includes a hollow tube inserted into a plastic plunger seat that is carried on the cap of the valve beneath the plunger of an actuating solenoid. Such a bleed assembly does not need a bleed tube having a precisely controlled length, and is not sensitive to flexure of the cap.

14 Claims, 4 Drawing Sheets

VALVE HAVING IMPROVED BLEED ASSEMBLY

TECHNICAL FIELD

The present invention relates generally to a valve for controlling the flow of a pressurized fluid, such as water, in a fluid supply line, such as a pipe in an irrigation system. More particularly, the present invention relates to a valve having having a an actuator, e.g. a solenoid, for selectively opening and closing a bleed tube to open and close the valve.

BACKGROUND OF THE INVENTION

Flow control valves are well known in irrigation systems. They are used to control the flow of pressurized water through a pipe and thereby allow sprinklers fed by the pipe to be turned on and off. Such valves are often remotely controlled by control signals sent from an automated irrigation controller. For example, the controller might send an electric actuating signal to a solenoid that is part of the valve to allow the valve to open.

One type of solenoid operated valve is shown in U.S. Pat. No. 4,505,450 to Saarem et al. This valve is made from two parts, namely a body portion in which the inlet, outlet and valve seat are formed and a separable cap on which an actuating solenoid is carried. A flexible diaphragm engages the valve seat to close the valve. A bleed tube assembly is supported in a support bracket in the valve body. The bleed tube assembly has an upper end located in a pressure chamber above the diaphragm and a lower end located below the diaphragm. The solenoid plunger normally seals against the upper end of the bleed tube to keep the valve closed. When the solenoid is actuated by a control signal, the plunger lifts up off the bleed tube to allow fluid pressure to bleed out of the pressure chamber, thereby opening the valve.

One difficulty of this prior art valve is that the length of the bleed tube must be precisely controlled during manufacture, and the bleed tube must be precisely installed in the support bracket during assembly or replacement thereof, to allow proper operation of the valve. This is difficult to do, particularly when working without special tools when replacing the bleed tube i the field. For example, if the bleed tube is not pushed into the support bracket to exactly the proper depth, then it may be too long and jam the solenoid plunger. Alternatively, if the bleed tube is made too short, or if it is inadvertently pushed down into the support bracket too far, then the plunger will never be able to close the bleed tube, leading to improper operation. Moreover, flexure of the cap of the valve, due for example to heat absorption, may cause the plunger to become misaligned with the bleed tube of the prior art valve, even when the valve was initially properly manufactured or serviced.

SUMMARY OF THE INVENTION

One aspect of this invention is to provide a valve which is easier to manufacture than the prior art valve and which is more reliable in operation.

Thus, an improved valve according to this invention contains a valve seat and a movable valve element for sealing against the valve seat. A pressure chamber is located in the valve on one side of the valve element. A bleed assembly extends through the valve element ad has a first end located in the pressure chamber and an open second end located on the other side of the valve element. The valve includes movable plunger means for selectively sealing against the first end of the bleed assembly to control the flow of fluid through the bleed assembly and thereby control the operation of the valve.

The improvement specifically relates to the a bleed assembly and, more particularly, to a bleed assembly comprising an elongated hollow bleed tube and an enlarged plunger seat. The seat has a flow passageway extending therethrough between an inlet and an outlet. One end of the bleed tube is inserted into the flow passageway such that the bleed tube forms a continuation of the flow passageway. Means is provided for supporting the plunger seat proximately to the plunger means to allow the plunger means to close against the inlet of the plunger seat.

BRIEF DESCRIPTION OF THE DRAWINGS

The present invention will be described hereafter in the Detailed Description, taken in conjunction with the following drawings, in which like reference numerals refer to like elements or parts throughout.

DETAILED DESCRIPTION

Figure 1:
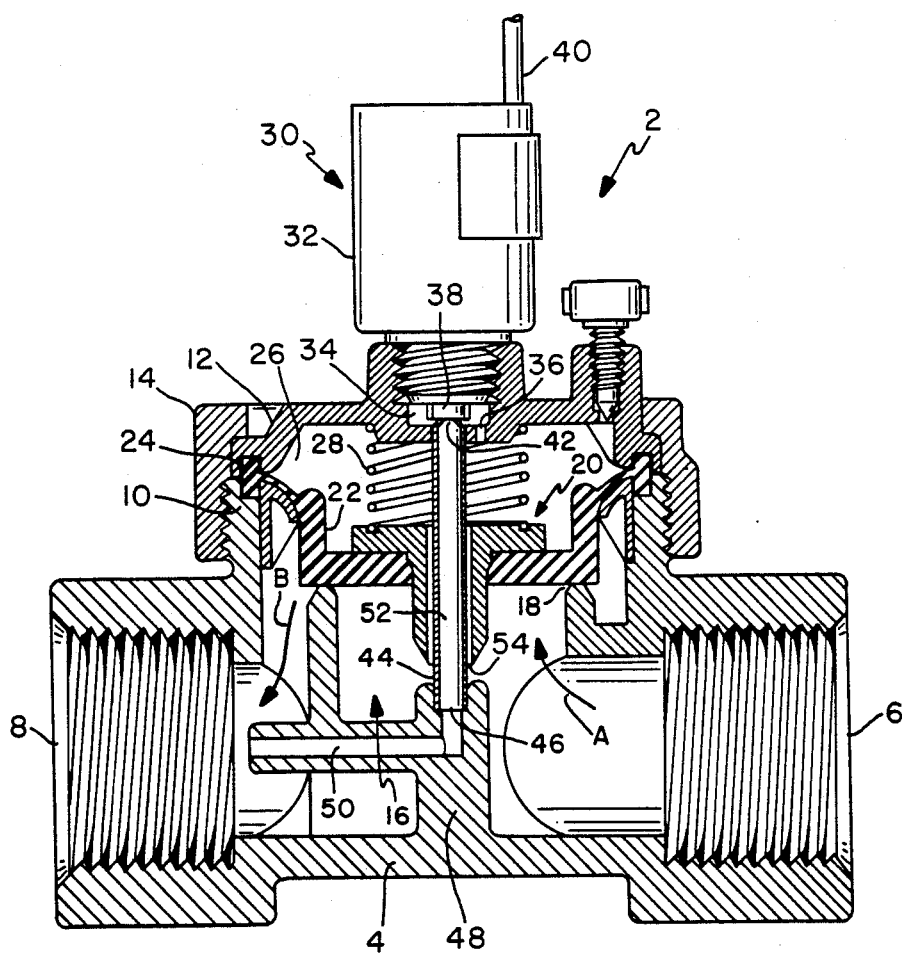
FIG. 1 is a cross-sectional view of a prior art valve of the type to which the present invention relates, and more particularly to a prior art valve of the type shown in U.S. Pat. No. 4,505,450.

Referring first to FIG. 1, a prior art valve of the type to which the present invention relates is generally illustrated as 2. More specifically, valve 2 is of the type shown in U.S. Pat. No. 4,505,450 to Saarem et al, which patent is incorporated by reference herein. The Saarem patent may be read for a complete description of this type of valve. However, valve 2 will be described herein to the extent necessary to understand and appreciate the present invention.

Valve 2 includes a body 4 having an inlet 6 and an outlet 8 which may be connected in any suitable manner, e.g. using threaded connections, to fluid supply lines (not shown). Valve body 4 includes an open upper end 10 which is closed by a cover or cap 12 held on body 4 by a threaded nut 14. Valve body 4 also includes a central cavity 16 having an annular, upwardly facing valve seat 18. Fluid entering inlet 6 passes upwardly through the interior of valve seat 18, as shown by the arrows A, and then passes over valve seat 18 to exit body 4 through outlet 8, as shown by the arrows B.

Valve 2 includes a valve element comprising a flexible diaphragm assembly 20 which seals against valve seat 18 to cut off the flow of fluid to outlet 8. Diaphragm assembly 20 includes a cup shaped rubber diaphragm 22 having an annular peripheral edge 24 that is tightly clamped between valve body 4 and cap 12 when nut 14 is tightened. The area or space between diaphragm 22 and cap 12 forms a pressure chamber 26 in which fluid pressure from inlet 6 is received. In addition, a spring 28 is contained in pressure chamber 26 for pushing down on diaphragm assembly 20 to help seal diaphragm 22 against valve seat 18.

An actuating member 30 comprising an electrical solenoid 32 is carried by cap 12 with solenoid 32 being screwed into cap 32 and thus being separable therefrom. Pressure chamber 26 also includes the area 34 immediately beneath solenoid 32 since fluid pressure in pressure chamber 26 flows into area 34 through a small port 36. Solenoid 32 includes a plunger 38 which is vertically raised when solenoid 32 is actuated by the application of an electric control signal thereto through control line(s) 40. Normally, when solenoid 32 is deenergized, plunger 38 is lowered until it seals against the open upper end 42 of a bleed tube 44.

Bleed tube 44 extends downwardly from its upper end 42 through diaphragm assembly 20 with the lower end 46 of bleed tube 44 being press fit into a support bracket 48 contained in valve body 4. Support bracket 48 includes a flow passageway 50 which is in line with outlet 8 of valve body 4. Flow passageway 50 is in fluid communication with a longitudinal bore 52 in bleed tube 44. Diaphragm assembly 20 is not tightly sealed against bleed tube 44, but a loose fit results in a small metering gap 54 between diaphragm assembly 20 and bleed tube 44.

In the operation of prior art valve 2, assume that solenoid 32 is deenergized, thereby closing upper end 42 of bleed tube 44. If fluid pressure is present at inlet 6, such pressure will pass through metering gap 54 until the fluid pressure in pressure chamber 26 (acting down on diaphragm assembly 20) is equal to the fluid pressure at inlet 6 (acting up on diaphragm assembly 20). In such a "hydraulically balanced" condition, the fluid pressure in pressure chamber 26 with the assistance of the downward force of spring 28 is effective to keep diaphragm 22 sealed against valve seat 18, thereby preventing fluid from flowing through to outlet 8 and thus defining the closed position of valve 2.

Now, if it is desired to open valve 2, a control signal is sent energizing solenoid 32 and lifting plunger 38 up off the upper end 42 of bleed tube 44. This allows the fluid pressure in chamber 26 to begin bleeding out through bleed tube 44, flow passageway 50 and outlet 8. As the fluid pressure bleeds out of chamber 26 in this manner, the fluid pressure at inlet 6 acting against the bottom of diaphragm assembly 20 is able to begin raising diaphragm 22 up off valve seat 18 overcoming the force of spring 28, thereby allowing valve 2 to begin opening with fluid pressure exiting through outlet 8. The passage of fluid through outlet 8 has a Venturi effect on bleed tube 44, which rapidly bleeds off any remaining pressure in pressure chamber 26, thereby allowing full and complete opening of valve 2.

While prior art valve 2 as just described is operative to control the flow of fluid in a pressurized fluid supply system, such as a irrigation system, various difficulties have been presented by the particular construction and support of bleed tube 44. In order for valve 2 to work properly, solenoid plunger 38 must precisely mate against and close the upper end 42 of bleed tube 44 when solenoid 32 is deenergized. If bleed tube 44 is a bit shorter than it should be, then plunger 38 may not close off bleed tube 44 even when it is deenergized, thereby leading to a malfunction in the valve operation. Or, if bleed tube 44 is a bit longer than it should be, bleed tube 44 may jam against solenoid plunger 38 and not allow valve 2 to operate or may damage solenoid 32.

Since bleed tube 44 is supported by pressing it into support bracket 48 contained in valve body 4, the length of bleed tube 44 must be strictly controlled within relatively close tolerance to ensure that upper end 42 thereof will be properly positioned proximate plunger 38. In addition, even with a bleed tube 44 of the proper length, tube 44 must also be inserted to just the right depth in support bracket 48. Since assembly of these components is often done by hand, especially when servicing valve 2 in the field, errors will occur from time to time. Thus, it is quite difficult to achieve the close tolerances required in manufacturing bleed tube 44 and/or positioning tube 44 in support bracket 48, which difficulties are obviously undesirable.

Moreover, even if a valve 2 is properly manufactured and sent to the field, the construction of bleed tube 44 can still lead to operating difficulties. In cases where valve 2 is exposed to a heat source, such as the sun, it is not uncommon for there to be some upward flexure of cap 12 due to heat absorption. Since solenoid 32 is carried on cap 12, this flexure raises solenoid 32 relative to bleed tube 44. In many such cases, this flexure can be severe enough to cause solenoid plunger 38 to disengage upper end 42 of bleed tube 44 even in the deenergized state of solenoid 32, thus leading to the same valve malfunction as if bleed tube 44 were too short.

Figure 2:
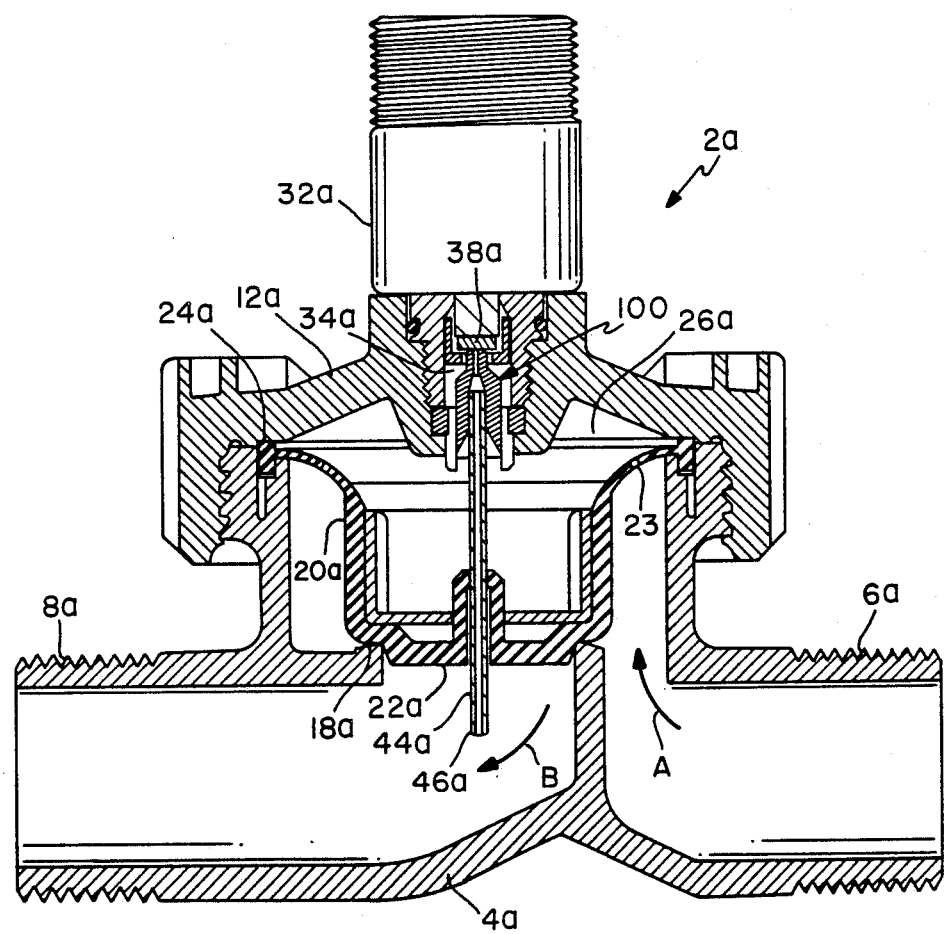
FIG. 2 is a cross-sectional view of an improved valve according to a first embodiment of the present invention.
Figure 3:
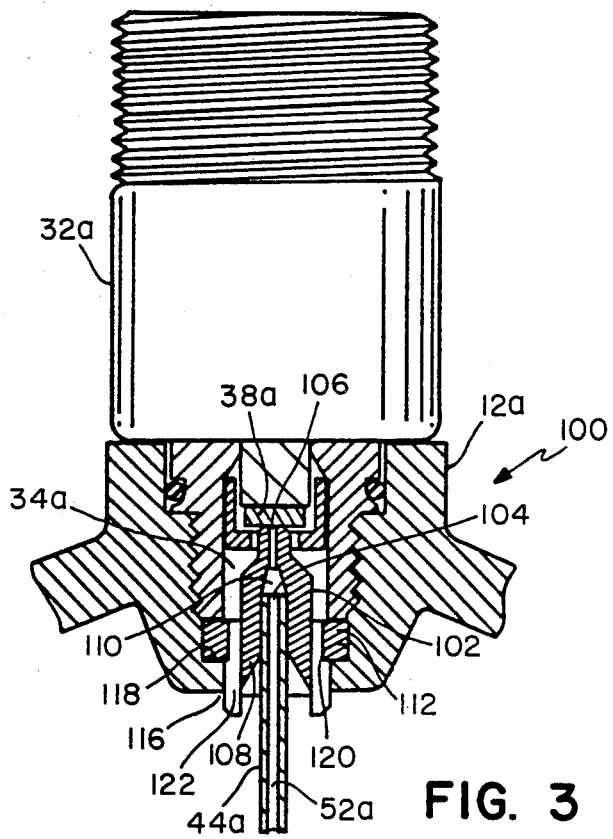
FIG. 3 is an enlarged cross-sectional view of the bleed tube assembly of the valve shown in FIG. 2, particularly illustrating the plugger seat and bleed tube combination and its relationship to the solenoid actuator.
Figure 4:
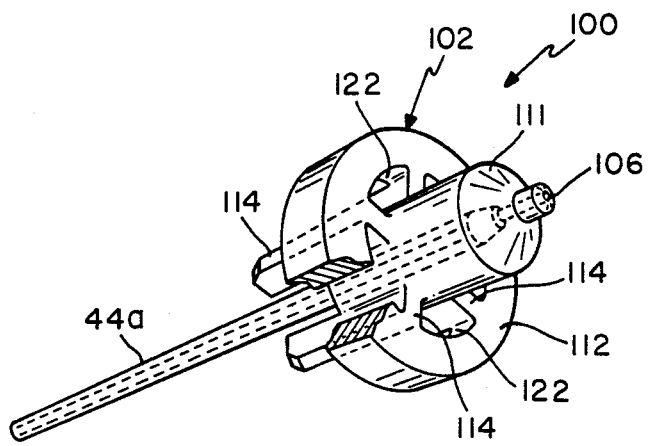
FIG. 4 is an enlarged perspective view of the upper end of the bleed tube assembly of the valve shown in FIG. 2, particularly illustrating the plunger seat and bleed tube.

Referring now to FIGS. 2-4, an improved valve according to a first embodiment of the present invention is indicated generally as 2a. Valve 2a is of the same type as valve 2, having many similar or corresponding components which will be identified using the same reference numerals as their counterparts in valve 2 with the addition of an "a" suffix. Thus, valve 2a includes a valve body 4a closed by a cap 12a, etc. The present invention incorporates an improved bleed tube assembly identified generally as 100 in combination with the other components of valve 2a.

Before discussing bleed tube assembly 100, a few specific differences between valve 2a and valve 2 should be noted. For example, the direction of fluid flow through valve 2a is somewhat different than valve 2, i.e. water flowing from inlet 6a passes in the annular space around the outside of valve seat 18a, as shown by the arrows A, and thereafter flows downwardly into the interior of valve seat 18a to reach fluid outlet 8a, as shown by the arrows B. In addition, a separate metering hole 23 is placed in diaphragm 22a to meter fluid pressure at inlet 6a into pressure chamber 26a to close valve 2a. This requires that diaphragm 22a have a sliding seal at its interface with bleed tube 44a to prevent leakage, not a loose fit. Moreover, since the area of diaphragm 22a which is exposed to fluid pressure in chamber 26a, which generates the closing force on diaphragm 22a, exceeds the area of diaphragm 22a exposed to fluid pressure at inlet 6a, which generates the opening force on diaphragm 22a, diaphragm 22a will close without requiring an additional spring as in valve 2.

Referring now to FIGS. 3 and 4, improved bleed tube assembly 100 includes an elongated bleed tube 44a and a separate plunger seat 102 secured thereto. Bleed tube 44a has a longitudinal bore 52a extending all the way therethrough. Plunger seat 102 also has a longitudinal flow passageway 104 having a reduced diameter inlet 106 at the upper end thereof and an outlet 108 at the lower end thereof. Bleed tube 44a is secured to plunger seat 102 by pressing bleed tube 44a through outlet 108 of plunger seat 102 and into flow passageway 104 thereof with the press fit being tight enough to hold the two together in an assembled relationship without additional securing means. However, it is not important how far bleed tube 44a is press fit into plunger seat 102. Typically, there will be a pocket 110 left between the end of bleed tube 44a and the end of flow passageway 104 which pocket 110 may well vary in depth from one bleed tube assembly 100 to the next. All that is important is that bleed tube 44a have a sufficient length to extend down through diaphragm assembly 20a to terminate in a lower end 46a located a comfortable distance beneath diaphragm assembly 20a.

Plunger seat 102 comprises a generally cylindrical body 111 having an annular rim 112 connected thereto by four radial ribs 114. Ribs 114 also extend longitudinally beneath rim 112 and are sized to have a particular diameter allowing plunger seat 102 to be received in a circular opening 116 located in a horizontal flange 118 carried on cap 12a. An annular shoulder 120 is molded into flange 118 adjacent opening 116 for receiving rim 112 of plunger seat 102 to thereby support bleed tube assembly 100 thereon. A plurality of pie-shaped ports 122 are defined between ribs 114 which allows fluid pressure in pressure chamber 26a to flow upwardly around body 110 of plunger seat 102 to reach inlet 106 of plunger seat 102.

Plunger seat 102 will typically be molded of a plastic material similar to that used in valve body 4a and cap 12a, and thus the distance between rim 112 and inlet 106 can be relatively precisely controlled due to the precision which is relatively easily achievable with plastic molding. In assembling improved valve 2a, bleed tube 44a, which is preferably made of a metallic material, can be press fit into plunger seat 102 without having to control the precise amount of insertion to any significant degree. Once so assembled, bleed tube assembly 102 is simply dropped down into cap 12a until rim 112 is adjacent shoulder 120 with ribs 114 being received in opening 116. Solenoid 32a can then be screwed down on top of plunger seat 102a until the bottom of solenoid 32a abuts against rim 112 and forces rim 112 tightly down into engagement with shoulder 120. When so assembled, plunger 38a of solenoid 32a will be located precisely at the right position to close off inlet 106 of plunger seat 102 without having had to precisely control the length of bleed tube 44a or its degree of insertion into plunger seat 102.

The advantages of improved valve 2a over prior art valve 2 are clearly apparent in the ease of manufacture just noted. In addition, valve 2a is not sensitive to malfunction due to cap flexure since bleed tube assembly 100 is supported only at its upper end in cap 12a itself. Thus, even if cap 12a flexes upwardly due to heat expansion, it carries with it the entire bleed tube assembly and the relative positioning of the inlet end of the plunger seat and the solenoid plunger does not change. All that happens is that bleed tube 44a is drawn slightly upwardly through diaphragm assembly 20a. However, as long as bleed tube 44a is sufficiently long so that its lower end is always beneath diaphragm assembly 20a regardless of the maximum cap flexure possible, then nothing untoward happens and valve 2a continues to function normally.

Figure 5:
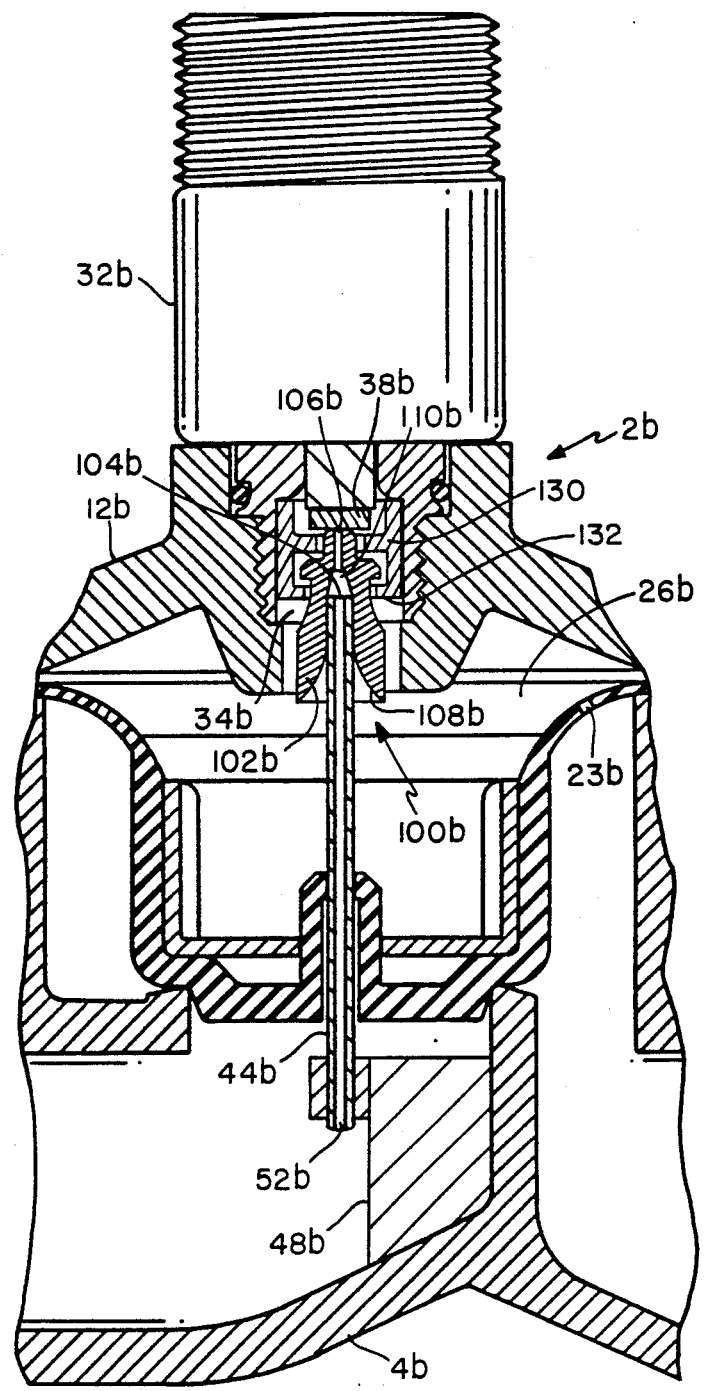
FIG. 5 is an enlarged cross-sectional view of an improved valve according to a second embodiment of the present invention, particularly illustrating the plunger seat carried as part of the solenoid and the bleed tube carried in the valve body.

Referring now to FIG. 5, a second embodiment of an improved valve according to the present invention is illustrated generally as 2b. To the extent valve 2b has components which are similar or correspond to components found in either prior art valve 2 or valve 2a according to the first embodiment described above, such components will be identified using the same reference numerals as their counterparts with the addition of a "b" suffix. Thus, valve 2b has a cap 12b, a solenoid 32b having a plunger 38b, etc. In addition, valve 2b includes an improved bleed tube assembly 100b which in some ways is quite similar to that in valve 2b, but in which important differences exist.

More particularly, bleed tube assembly 100b has two components joined together, namely a plunger seat 102b and a bleed tube 44b inserted into plunger seat 102b. However, plunger seat 102b does not grip and hold bleed tube 44b as it did in valve 2a so that plunger set 102b does not support bleed tube 44b in valve body 4b. Instead, a separate support bracket 48b positioned in valve body 4b firmly holds lower end 46b of bleed tube 44b in a manner similar to bracket 48 in prior art valve 2. However, support bracket 48b is shaped somewhat differently from bracket 8, not having elongated flow passageway 50 for example, though the exact shape of support bracket 48b is not important as long as it properly supports bleed tube 48b.

Since bleed tube 44b has its lower end supported in a support bracket 48b like prior art valve 2, on would naturally assume that valve 2b would be confronted by the same need to precisely manufacture and position bleed tube 44b as was true for bleed tube 44. However, bleed tube 44b is purposely undersized somewhat so that a significant distance would normally occur between its upper end and solenoid plunger 38b even when solenoid 32b is completely assembled on cap 12b and is deenergized.

Solenoid 32b normally includes a plunger retainer 130, i.e. a member which retains plunger 38b in the body of solenoid 32b. Plunger retainer 130 is modified to have an inwardly extending flange 332 that supports and carries plunger seat 102b with it so that plunger seat 102b has its inlet 106b vertically held at the right location for proper closure by plunger 38b In other words, plunger seat 102b is carried with solenoid 32b and is, in effect, part of solenoid 32b. Plunger retainer 130 has suitable vertical flow passages therein, or a sufficiently loose radial fit with plunger seat 102b, to allow fluid pressure in the upper portion 34b of pressure chamber 26b to reach inlet 106b of plunger seat 102b.

Plunger seat 102b is shaped quite similarly to plunger seat 102 in valve 2a, except that outlet 108b of flow passageway 104b is flared outwardly to allow plunger seat 102b to engage and be centered on upper end 42b of bleed tube 44b when solenoid 32b is assembled on cap 12b. However, since bleed tube 44b is actually supported by lower support bracket 48b, there is no need for a firm press fit of bleed tube 44b into plunger seat 102b in this instance, only that there be enough of an insertion so that flow passageway 104b is in fluid communication with bore 52b of bleed tube 44b without leakage around bleed tube 44b. As a matter of fact, there will necessarily be a sliding fit between the bleed tube 44b and plunger seat 102b.

Valve 2b clearly has the same advantages of manufacture and operation over prior art valve 2 as was true of valve 2a. Even though bleed tube 44b is supported at its lower end in valve body 4b, the length of bleed tube 44b can be undersized enough so that no tolerance problems are encountered in manufacturing it. When solenoid 32b is screwed down into cap 12b, plunger seat 102b will engage upper end 42b of bleed tube 44b and slide down bleed tube 44b until solenoid 32b is completely screwed in. Any variations in the length of bleed tube 44b will be compensated for by leaving the length of flow passageway 104b sufficiently long so that a pocket 110b always be left therein despite any possible differences in bleed tube length. Again, plunger seat 102b is precisely molded to have just the right length, and it will always be precisely positioned relative to plunger 38b despite differences in the length of bleed tube 44b.

Moreover, it can also be seen that valve 2b is just as resistant to cap flexure problems as valve 2a. If cap 12b flexes and raises solenoid 32b upwardly with it, for example, plunger seat 102b will simply slide up bleed tube 44b a short distance. Since plunger seat 102b is now part of solenoid 32b and travels with it, cap flexure will be accommodated without disturbing the relationship between plunger seat 102b and plunger 38b. Bleed tube 44b must simply be long enough to be retained inside in flow passageway 104b under maximum conditions of cap flexure, while short enough to always leave pocket 110b in flow passageway 104b considering the maximum possible manufacturing variations in bleed tube length, Accordingly, flexure of cap 12b will not affect the normal and ordinary operation of valve 2b.

Various modifications of this invention will be apparent to those skilled in the art. Thus, the cope of the present invention is to be limited only by the appended claims.

We claim:

1. An improved valve of the type containing a valve seat and a movable valve element for sealing against the valve seat, a pressure chamber in the valve on one side of the valve element, a bleed assembly extending through the valve element and having a first end located in the pressure chamber and an open second end located on the other side of the valve element, movable plunger means carried on the valve for selectively sealing against the first end of the bleed assembly to control the flow of fluid through the bleed assembly and thereby control the operation of the valve, wherein the improvement relates to a bleed assembly comprising:
   (a) an elongated hollow bleed tube;
   (b) an enlarged plunger seat having a flow passageway extending therethrough between an inlet and an outlet, wherein one end of the bleed tube is inserted into the flow passageway such that the bleed tube forms a continuation of the flow passageway; and
   (c) means for supporting the plunger seat proximately to the plunger means to allow the plunger means to close against the inlet of the plunger seat, wherein the valve comprises a valve body closed by a separable cap, and wherein the supporting means is carried in the cap, the cap being made of a particular type of material that allows the cap to flex due to some external environmental condition for permitting the bleed tube and the plunger seat to move with the cap as the cap flexes to always maintain the same relative distance between the plunger means and the plunger seat.

2. An improved valve as recited in claim 1, wherein the supporting means comprises a shoulder extending radially inwardly relative to the bleed tube, and wherein the plunger seat is received against the shoulder to support the plunger seat thereon in the cap.

3. An improved valve as recited in claim 2, wherein the bleed tube is fixedly secured to the plunger seat such that the plunger seat is the sole support for the bleed tube.

4. An improved valve as recited in claim 3, wherein the bleed tube has an open longitudinal bore therein, and wherein the plunger seat has a flow passageway extending therethrough between an inlet and an outlet, wherein the flow passageway is in fluid communication with the bore when the tube is inserted into the flow passageway, and wherein the plunger means abuts against the inlet of the flow passageway.

5. An improved valve as recited in claim 4, further including flow passages extending through the plunger seat to allow fluid in the pressure chamber to flow into the inlet of the plunger seat when the plunger means is disengaged therefrom.

6. An improved valve as recited in claim 5, wherein the plunger seat is made from a plastic material.

7. An improved valve as recited in claim 1, wherein the plunger means is part of a solenoid carried on the cap.

8. An improved valve as recited in claim 1, wherein the plunger means is part of a solenoid carried on the cap, wherein the supporting means for the plunger seat is a part of the solenoid so that the plunger seat is carried with the solenoid, and further including a support bracket contained in the valve body for fixedly supporting the bleed tube therein.

9. An improved valve as recited in claim 8, wherein the bleed tube has an open longitudinal bore therein, wherein the plunger seat has a flow passageway extending therethrough between an inlet and an outlet, wherein the flow passageway is in fluid communication with the bore when the tube is inserted into the flow passageway, and wherein the plunger means abuts against the inlet of the flow passageway.

10. An improved valve as recited in claim 9, wherein the solenoid is separable from the cap, and wherein the outlet of the flow passageway is flared outwardly to more easily engage the bleed tube when the solenoid is joined to the cap.

11. An improved valve for controlling the flow of a liquid, which comprises:
   (a) an inlet, an outlet, a flow path for liquid flowing from the inlet to the outlet, a valve seat located in the flow path, and a valve body and a cap separably attached thereto;
   (b) a valve member movably carried in the valve for sealing against the valve seat, one side of the valve member being exposed to fluid pressure at the inlet and the other side of the valve element forming a portion of a pressure chamber for receiving fluid pressure from the inlet;
   (c) a bleed assembly having a first end supported in the pressure chamber and a second end supported on the opposed side of the valve element in the flow path, wherein the bleed assembly is supported in the valve only at the first end thereof, wherein the bleed assembly comprises a plunger seat secured to a bleed tube, and wherein the bleed assembly includes support means for supporting the bleed assembly in the cap; and
   (d) actuating means carried on the cap for selectively closing and opening the first end of the bleed assembly to selectively bleed off or restore fluid pressure in the pressure chamber, thereby opening or closing the valve member, the cap being made of a particular type of material that allows the cap to flex due to some external environmental condition for permitting the bleed tube and the plunger seat to move with the cap as the cap flexes to always maintain the same relative distance between the actuating means and the plunger seat.

12. An improved valve for controlling the flow of a liquid, which comprises:
    (a) an inlet, an outlet, a flow path for liquid flowing from the inlet to the outlet, a valve seat located in the flow path, and a valve body and a cap separably attached thereto;
    (b) a valve member movably carried in the valve for sealing against the valve seat, one side of the valve member being exposed to fluid pressure at the inlet and the other side of the valve element forming a portion of a pressure chamber for receiving fluid pressure from the inlet;
    (c) a bleed assembly having a first end supported in the pressure chamber and a second end supported on the opposes side of the valve element in the flow path, wherein the bleed assembly is separate from the cap and valve body and comprises a plunger seat and an elongated bleed tube extending from the plunger seat, wherein the plunger seat comprises the first end of the bleed assembly;
    (d) actuating means carried on the valve for selectively closing and opening the first end of the bleed assembly to selectively bleed off or restore fluid pressure in the pressure chamber, thereby opening or closing the valve member; and
    (e) wherein the cap has an upwardly opening cavity into which the bleed assembly may be dropped, the cavity having means cooperating with a portion of the bleed assembly for supporting the bleed assembly in the valve, the cavity further having means for releasably securing the actuating means therein on top of the bleed assembly to retain the bleed assembly in the cavity, whereby the bleed assembly may be replaced by removing the actuating means from the cavity to gain access to the bleed assembly such that the bleed assembly may be lifted up out of the cavity without removing or replacing the cap itself.

13. An improved valve as recited in claim 12, wherein the supporting means comprises radially inwardly extending shoulder means in the cavity adjacent an opening in the cap, and wherein the plunger seat includes radially outwardly extending rim means received against the shoulder means of the cavity with the bleed tube extending down through the opening into the valve.

14. An improved valve as recited in claim 13, wherein the bleed tube is separate from the plunger seat and is telescopically carried on the plunger seat.

* * * * *